United States Patent
Kodachi et al.

(10) Patent No.: US 12,504,359 B2
(45) Date of Patent: Dec. 23, 2025

(54) MICROPLASTIC DISCHARGE AMOUNT ASSESSMENT METHOD, AND PRODUCT ASSESSMENT DISPLAY METHOD USING SAME

(71) Applicants: itochu fashion system co., ltd., Tokyo (JP); ITOCHU Corporation, Osaka (JP)

(72) Inventors: Kensuke Kodachi, Tokyo (JP); Kentaro Morishita, Osaka (JP)

(73) Assignees: Itochu Fashion System Co., Ltd., Tokyo (JP); ITOCHU Corp., Osaka (JP)

(*) Notice: Subject to any disclaimer, the term of this patent is extended or adjusted under 35 U.S.C. 154(b) by 447 days.

(21) Appl. No.: 17/926,602

(22) PCT Filed: May 21, 2021

(86) PCT No.: PCT/JP2021/019450
§ 371 (c)(1),
(2) Date: Nov. 20, 2022

(87) PCT Pub. No.: WO2021/235550
PCT Pub. Date: Nov. 25, 2021

(65) Prior Publication Data
US 2023/0358662 A1    Nov. 9, 2023

(30) Foreign Application Priority Data
May 22, 2020    (JP) .................................. 2020-089406

(51) Int. Cl.
*G01N 15/06*    (2024.01)
*G01N 1/34*    (2006.01)
*G01N 5/02*    (2006.01)

(52) U.S. Cl.
CPC .......... *G01N 15/0618* (2013.01); *G01N 1/34* (2013.01); *G01N 5/02* (2013.01)

(58) Field of Classification Search
CPC .. G01N 5/02; G01N 5/04; G01N 1/34; G01N 1/10; G01N 15/0618; G01N 33/36; G01N 2001/1006; D06H 3/00; Y02W 30/62
(Continued)

(56) References Cited

U.S. PATENT DOCUMENTS 5,618,431 A * 4/1997 Kondo ...................... C02F 3/06
                                                                 210/794
5,989,416 A * 11/1999 Gorton ...................... C02F 3/04
                                                                 210/197
(Continued)

FOREIGN PATENT DOCUMENTS

CN    101911155 A    12/2010
CN    206285589 U    6/2017
(Continued)

OTHER PUBLICATIONS

Microplastic emissions from domestic laundry, A laboratory work resulting in a comparison between the amount of fibres released from different synthetic textiles, Rebecka et al. (Year: 2019).*
(Continued)

*Primary Examiner* — Jacques M Saint Surin
(74) *Attorney, Agent, or Firm* — IpHorgan Ltd.

(57) ABSTRACT

Provided is a microplastic discharge amount assessment method with which it is possible to objectively quantitatively assess the discharged amount of microplastic discharged from a textile product containing a synthetic resin. The microplastic discharge amount assessment method is characterized by including: a cleaning step for retrieving a test piece of a specified size or mass from a textile product containing a synthetic resin, and cleaning said test piece; a
(Continued)

filtering step for using a filter to filter all wastewater discharged in the cleaning step; a measurement step for measuring the mass of textile waste trapped by the filter; and an assessment step for assessing the discharged amount of microplastic discharged from the textile product, on the basis of the measurement result from the measurement step.

4 Claims, 3 Drawing Sheets

(58) Field of Classification Search
USPC .......................................................... 177/1
See application file for complete search history.

(56) References Cited

U.S. PATENT DOCUMENTS

| | | | | |
|---|---|---|---|---|
| 9,121,000 | B2* | 9/2015 | Burkinshaw | C11D 3/12 |
| 9,448,222 | B2* | 9/2016 | Lutgendorf | G01N 33/442 |
| 9,732,453 | B2* | 8/2017 | Saitoh | D04H 3/14 |
| 10,864,465 | B2* | 12/2020 | Boyd | B01D 24/4626 |
| 2018/0217029 | A1 | 8/2018 | Billings | |
| 2018/0320306 | A1 | 11/2018 | Spies | |
| 2020/0391141 | A1 | 12/2020 | Spies | |
| 2020/0408734 | A1 | 12/2020 | Ferrante | |
| 2021/0047756 | A1 | 2/2021 | Ammen | |
| 2022/0298696 | A1 | 9/2022 | Kimura | |

FOREIGN PATENT DOCUMENTS

| | | | |
|---|---|---|---|
| CN | 111103231 | A | 5/2020 |
| JP | 2001-347254 | A | 12/2001 |
| JP | 2007020639 | A | 2/2007 |
| JP | 2014-021609 | A | 2/2014 |
| JP | 2014021609 | * | 2/2014 |
| JP | 2019505351 | A | 2/2019 |
| WO | 2019171312 | A1 | 9/2019 |
| WO | 20190166179 | A1 | 9/2019 |
| WO | 2021030456 | A1 | 2/2021 |
| WO | 2021039520 | A1 | 3/2021 |

OTHER PUBLICATIONS

Aiming to reduce marine pollution by the textile industry, World's Authentication; by itochu fashion system co., ltd., Textile, Monthly Report, Mar. 2020, vol. 719, p. 6, lower paragraph, published by Itochu Corporation. https://www.itochu.co.jp/ja/business/textile/geppo/2020/_icsFiles/afieldfile/2020/02/27/geppo_vol719.pdf.

Senken Shimbun (newspaper), second page, published on Nov. 21, 2019, Published by Senken Shimbun Co., Ltd.

Kensuke Kodachi; "Fiber Testing for Social Good by HC Lab", an exhibition board presented at "Itochu Exhibition 20AW" held from Nov. 19-21, 2019, presenter: Kensuke Kodachi.

"塑料与健康 第 1 版 (Plastic and Health 1st Edition)" pp. 39-40, China Environmental Protection Foundation and Chinese Research Academy of Environmental Sciences, Apr. 2019.

* cited by examiner

MICROPLASTIC DISCHARGE AMOUNT ASSESSMENT METHOD, AND PRODUCT ASSESSMENT DISPLAY METHOD USING SAME

CROSS REFERENCE TO RELATED APPLICATIONS

This application is a national stage completion application of PCT Application No. PCT/JP2021/019450, filed May 21, 2021, and claims priority from Japanese Patent Application No. 2020-089406, filed May 22, 2020. Each of these applications is incorporated by reference herein in its entirety.

TECHNICAL FIELD

The present invention relates to a microplastic discharge amount assessment method and a product assessment display method using the same, and in particular to a microplastic discharge amount assessment method for microplastic that is discharged from a textile product that contains a synthetic resin.

BACKGROUND ART

Microplastics are very small pieces of plastic that exist in an environment. Particularly in an ocean environment, marine organisms take in microplastics that float in seawater so as to store them within their bodies, which has in recent years drawn attention to the handling of microplastics. Microplastics are generally referred to as plastic pieces of which the diameter is 5 mm or less.

Synthetic fibers using plastics such as polyester or nylon are widely used particularly for clothes. These are converted to microplastics as a result of decomposition and pulverization due to physical or chemical effects when discarded in the environment in the same manner as other plastic products such as plastic bottles or straws.

Naturally, the final treatment of these plastic products is an important issue; however, more than that, clothes are washed on a daily basis, and textile waste is mixed in the wastewater after the laundry has been washed, and thus is released into the environment. Though a minute amount of textile waste is released into the environment after one wash, the effects of the total textile waste that has been released cannot be overlooked, taking into consideration the worldwide population and the amount of times people do the laundry.

Patent Literature 1 proposes a collection means for collecting synthetic resin fibers that have been washed off of textile products during the laundry process. The use of such a collection means is also one of the measures for suppressing the release of textile waste into the environment; however, in the first place, the suppression of the generation of textile waste itself in the laundry can be generally accepted, and thus is preferable.

At present, however, the discharge amount of textile waste in the laundry and information relating to this are not clearly stated in terms of a textile product or any index is not provided when a customer purchases a textile product.

CITATION LIST

Patent Literature

Patent Literature 1: Published Japanese Translation of PCT International Publication for Patent Application 2019-505351

SUMMARY OF THE INVENTION

Problems to be Solved by the Invention

An object of the present invention relates to the above-described problems to be solved by the invention, and thus, is to provide a microplastic discharge amount assessment method according to which the discharge amount of microplastics that are discharged from a textile product that contains a synthetic resin can be objectively and quantitatively assessed, and a product assessment display method that is useful when a consumer selects a textile product.

Means for Solving Problems

In order to achieve the above-described object, the microplastic discharge amount assessment method according to the present invention and the product assessment display method using the same have the following technical characteristics.

(1) A microplastic discharge amount assessment method may be characterized by including: a washing step of taking out a test piece of a predetermined size or of a predetermined mass from a textile product that contains a synthetic resin so as to wash the test piece; a filtering step of allowing a filter to filter the wastewater that has been discharged in the washing step; a measurement step of measuring the mass of the textile waste that has been captured by the filter; and an assessment step of assessing the discharge amount of microplastics that are discharged from the textile product on the basis of the result of measurement in the measurement step.

(2) The microplastic discharge amount assessment method according to the above (1) may be characterized by the usage of a laboratory washing machine that is prescribed in JIS L 0844, "Method for Testing Colorfastness in Laundry" for the washing in the washing step.

(3) The microplastic discharge amount assessment method according to the above (1) or (2) may be characterized in that the filter is a membrane filter.

(4) A product assessment display method may be characterized in that the assessment result gained by using the microplastic discharge amount assessment method according to any of the above (1) through (3) is displayed on a tag that is attached to a textile product formed of the same material as that of the test piece.

(5) A product assessment display method may be characterized in that the assessment result gained by using the microplastic discharge amount assessment method according to any of the above (1) through (3) is recorded in a management server connected to the Internet so that the access information that is required for the connection to the management server can be retained in a tag that is attached to a textile product formed of the same material as that of the test piece so as to be readable on a terminal that is connected to the Internet.

Advantageous Effects of the Invention

The present invention allows the discharge amount of microplastics to be objectively and quantitatively assessed in accordance with a microplastic discharge amount assessment method that is characterized by including: a washing step of taking out a test piece of a predetermined size or of a predetermined mass from a textile product that contains a synthetic resin so as to wash the test piece; a filtering step of allowing a filter to filter the wastewater that has been discharged in the washing step; a measurement step of measuring the mass of the textile waste that has been captured by the filter; and an assessment step of assessing the discharge amount of microplastics that are discharged from the textile product on the basis of the result of measurement in the measurement step. In addition, the assessment result gained by using the microplastic discharge amount assessment method can be displayed on a tag that is attached to a textile product or can be recorded in a management server that is connected to the Internet so that it becomes possible for a consumer to access the information in order to be provided with a useful index concerning the discharge amount of microplastics when the consumer selects a textile product.

DESCRIPTION OF EMBODIMENTS

In the following, the microplastic discharge amount assessment method according to the present invention and the product assessment display method using the same are described in detail in reference to the preferable examples.

Figure 1:
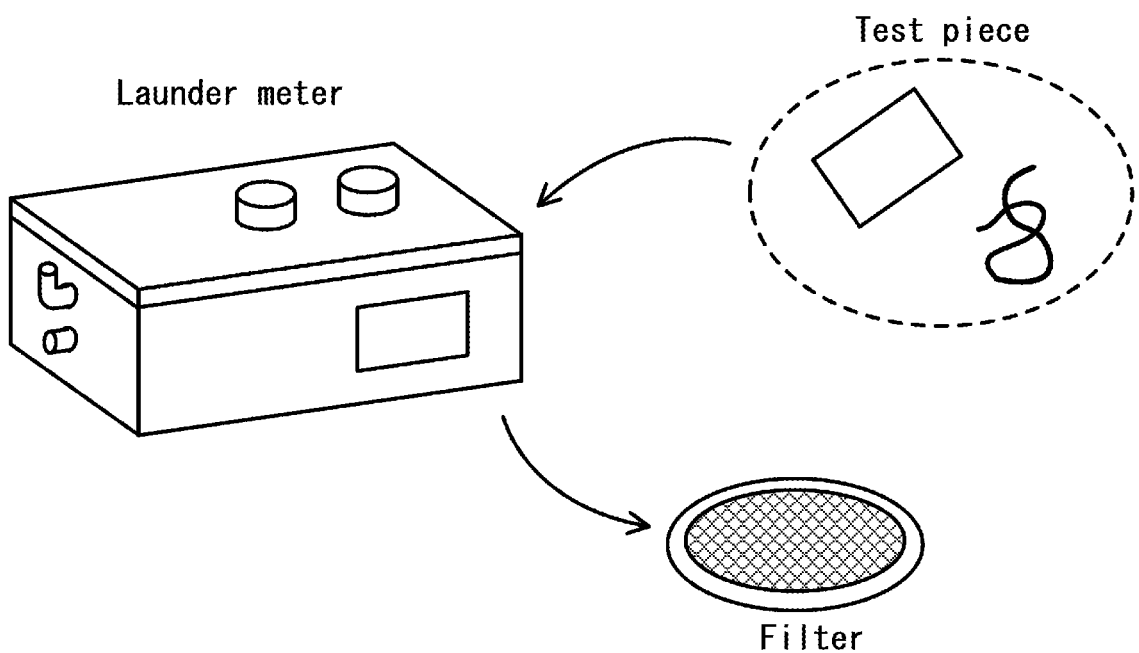
FIG. 1 is a diagram schematically showing the microplastic discharge amount assessment method according to the present invention.
Figure 2:
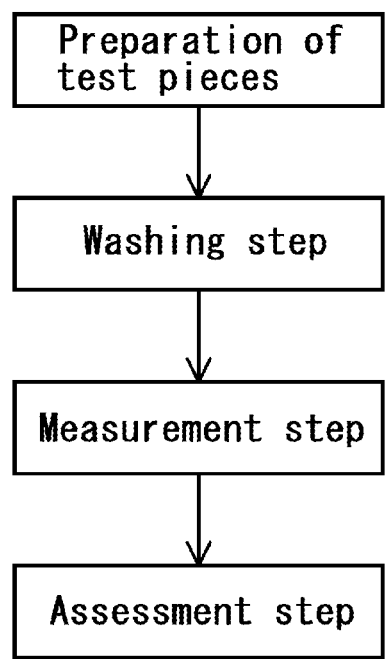
FIG. 2 is a flow chart showing the process for the microplastic discharge amount assessment method according to the present invention.

As shown in FIGS. 1 and 2, the present invention provides a microplastic discharge amount assessment method, characterized by including: a washing step of taking out a test piece of a predetermined size or of a predetermined mass from a textile product that contains a synthetic resin so as to wash the test piece; a filtering step of allowing a filter to filter the wastewater that has been discharged in the washing step; a measurement step of measuring the mass of the textile waste that has been captured by the filter; and an assessment step of assessing the discharge amount of microplastics that are discharged from the textile product on the basis of the result of measurement in the measurement step.

Textile products that contain a synthetic resin may be provided in the form of a raw fabric or a thread. In the case of a raw fabric, a test piece of a predetermined size (a rectangle of 100 mm×40 mm, for example) or of a predetermined mass that has been cut out from a raw fabric is used. In the case of a thread, a test piece of a predetermined size (a length of 100 mm, for example) or of a predetermined mass that has been cut out from a thread is used.

In the washing step for a test piece, the amount of textile waste that is released from the test piece varies due to the physical or chemical damage received by the test piece, and therefore, it is preferable to designate in advance the type of laboratory washing machine to be used for the washing and the procedure (process) of the washing. In addition, it is possible in the washing step for a test piece to add a treatment of rinsing with pure water before the washing for the test so that the step of removing stains or dust that are attached to the test piece can be included.

The laboratory washing machine to be used in the washing step is not particularly limited as long as a conventional laundry process can be reproduced. From among those, laboratory washing machines (launder meters) that are prescribed in the Japan Industrial Standards (JIS) L 0844, "Method for Testing Colorfastness in Laundry," where a concrete laundry process is disclosed, have a track record of being used in the industry and are provided as a product in the market, and thus can be preferably utilized in the present invention.

The above-described laboratory washing machines that are prescribed in the Japan Industrial Standards are formed of a test bin, a device for rotating the test bin, and a constant temperature water bath or a thermostat bath for maintaining a test liquid at a constant temperature within the test bin. In addition, in the washing step, not only a test piece and a test liquid, but also a prescribed number of stainless steel balls (made of SUS304 according to JIS G 4303 and with a diameter of approximately 6 mm) are put into the test bin.

As for the laundry process in the washing step, a laundry method that is prescribed in the Japan Industrial Standards as described above can be adopted, or it is also possible to prescribe a unique laundry process by using a laboratory washing machine that corresponds to the above. It is important to clearly state the laundry process in advance as an objective procedure in such a way that those skilled in the art can reproduce.

In addition, as for the test liquid to be used in the laundry process, synthetic detergents Number 1 and Number 2 are clearly stated in the Japan Industrial Standards, and thus, they can be used. Alternatively, a synthetic detergent that is available in the market and that matches the prescription in JIS K 3371 may be used if necessary. In this case, it is necessary to clearly state the product name of the synthetic detergent in the test report (Assessment Statement).

The washing step can include not only the laundry process where a test liquid is used, but also a water washing process after the laundry process. In particular, it is preferable in the microplastic discharge amount assessment method according to the present invention to repeat the water washing process a number of times, preferably two or more times, so that textile waste that has reattached to the test piece at the time when water is discharged in the laundry process can be collected.

The wastewater that is discharged in the washing step includes the test liquid in the laundry process and the washing water in the water washing process. In order to collect textile waste that is included in the wastewater, the treatment allows the wastewater to pass through a filter. It is preferable for the setting to allow all the wastewater to pass through the filter; however, the system may be preset in such a manner that only a predetermined amount of wastewater is allowed to pass through the filter in order to shorten the test time.

The material and the size of the mesh of the filter are not particularly limited as long as it is possible for the filter to be able to capture textile waste that is discharged from the test piece without fail; however, membrane filters that are inexpensive as a product that is available in the market and have a stable quality are a preferable product for the present invention. As for the size of the pores of a membrane filter to be used, the pore diameter is approximately 0.1 μm to 10 μm, which does not allow textile waste to pass through, and makes it possible for a test liquid that includes a synthetic detergent to pass through.

In order to measure the mass of the textile waste that has been captured by the filter, it is indispensable to separate the textile waste that has attached to the filter from the filter and to dry the textile waste. In the case of a filter such as a membrane filter where microscopic pores are created in a complex manner, the work of separating the textile waste from the filter becomes very troublesome. Therefore, it is also possible to compare the mass of the membrane filter before use and the mass after use (after being dried) in order to prescribe the difference thereof as the mass of the textile waste. It is also possible to combine a means for sucking the water content that has attached to the filter by means of a vacuum pump with a means for drying.

Textile products that discharge a large amount of textile waste can generally be assessed as a product that discharges a large amount of microplastics on the basis of the measured mass of the textile waste. In the case where the entire material of a textile product is synthetic fibers, it is possible to assess that all the textile waste is to be converted to microplastics. However, in the case where natural fibers (cotton, linen, silk, or the like) and synthetic fibers are mixed in a textile product, it is possible to treat the textile waste that has attached to the filter with a solvent so as to dissolve the natural fibers so that the natural fibers can be removed from the filter, and thus to find the mass of the fibers that have remained on the filter as a target for assessment. It is also possible for the assessment to multiply the mass of the textile waste by the mixture ratio of the synthetic fibers within the textile product.

Next, it is possible to use the numeric value of the measured mass of the textile waste as the assessment results as it is; however, the mass of the textile waste may be assessed in such a manner that the products are ranked (classes are set) in accordance with the mass of the textile waste so as to be referred to as "Excellent (First Class)", "Good (Second Class)," and so forth in the order of the smaller mass, which makes it possible for the consumer to more easily understand the performance assessment of the products.

As for the mass of the textile waste that becomes an assessment reference, the discharge amount greatly differs depending on the type of textile product for the same washing. Therefore, it is possible to set an assessment reference for each general type of textile product, though it is possible to use the common assessment reference for all the textile products. When an assessment reference is set, it is possible to categorize the textile products in reference to the average mass of the textile waste that is discharged from the products that are available in the market at present in such a manner that the textile product that discharges the textile waste of which the amount is less than the average by a predetermined ratio, for example, half or less, is categorized as "Excellent (First Class)," and the textile product of which the textile waste is less than the average by more than half to approximately 90% is categorized as "Good (Second Class)."

Actually, synthetic fiber mixed fabrics where short polyester fibers are used, mainly including napped plain cloth such as fleece and cloth with a raised back, were selected as a product to be tested, of which the discharge amount of microplastics was assessed in the following procedure.

(Test Apparatuses)

Products to be tested were 18 items of raised fabric products such as fleece. As the laboratory washing machine, a launder meter (Type: LS-12, made by Daiei Kagaku Seiki MFG. Co., Ltd.) was used, and as for the test bin and the stainless steel balls, the accessories of the launder meter were used.

As for the filter, a membrane filter (Product name: Omnipore™, made by Merck Millipore Ltd., product number: JCWP04700, size: the pore diameter is 10 µm, and the diameter is 4 mm) was used.

(Preparation of Test Pieces)

A fabric which was selected as a product to be tested was cut out to a size of 100×40 mm, and three test pieces per product to be tested were prepared.

(Washing Step and Measurement Step of Test Pieces)

150 ml of pure water and 25 stainless steel balls were put into a test bin, and the test liquid was maintained at 50° C. A test piece was put into the test liquid within the test bin, which was rotated for 30 minutes at a rotational speed of 40+/−2 rpm in order to wash the test piece. After that, the test liquid was discharged and 150 ml of pure water was added, and then, water washing (rinsing) was carried out. Water washing was carried out twice in total.

The test liquid and pure water that were discharged in the washing step were filtered through a filter. After being dried, the mass of the filter was measured. The mass of the filter was compared with that before use so as to calculate the mass of the textile waste. The same test was carried out on three test pieces in order to calculate the average mass of the textile waste of the corresponding item.

The same test was carried out on the 18 fleece items, and the average mass of the textile waste was calculated for each item. The average mass (discharge amount) of the textile waste of all the items was 6.4 mg. The distribution of the average mass (discharge amount) of all the items is shown in Table 1 as the result.

TABLE 1

| Discharge amount | 3.0 mg or less | 3.0-3.2 mg | 3.2-6.4 mg | 6.4 mg or more |
|---|---|---|---|---|
| The number of corresponding items | 1 | 1 | 5 | 11 |
| Distribution ratio | 5.6% | 5.6% | 27.1% | 61.1% |

In reference to the results in Table 1, in the case where the assessment index of "Excellent (First Class)" is set for an item of which the average mass (discharge amount) of the textile waste is 0 to less than 2 mg, for example, the product can be assessed that the discharge amount is suppressed to approximately 30% or less than the commercially available general product (6.4 mg). In the case where the assessment index of "Good (Second Class)" is set for an item of which the average mass (discharge amount) of the textile waste is 2 to less than 3 mg, the product can be assessed that the discharge amount is suppressed to half or less than half of the general product.

Next, the product assessment display method according to the present invention is described.

Figure 3A:
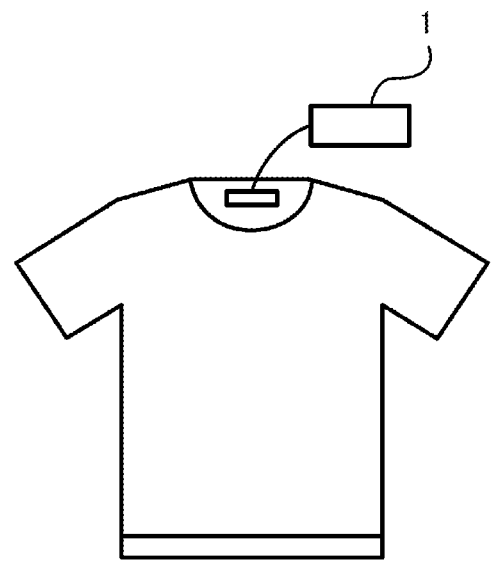
FIGS. 3A and 3B are diagrams showing an example of the product assessment display method according to the present invention.
Figure 3B:
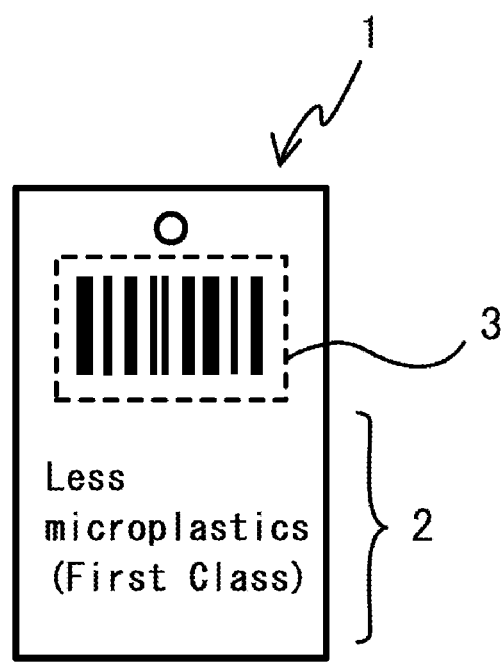

Concerning the result of assessment in accordance with the microplastic discharge amount assessment method, as shown in FIG. 3A, a tag 1 can be attached to a product that is formed of the same material as that of the test pieces. By checking this tag, it becomes possible for a consumer to easily understand that the product is an excellent product where the burden on the environment has been reduced. As shown in FIG. 3B, the tag 1 has a saying, "Less microplastic (First Class)," and in this way, it is also possible to show the assessment rank or the average mass of the discharge amount of microplastic.

Figure 4:
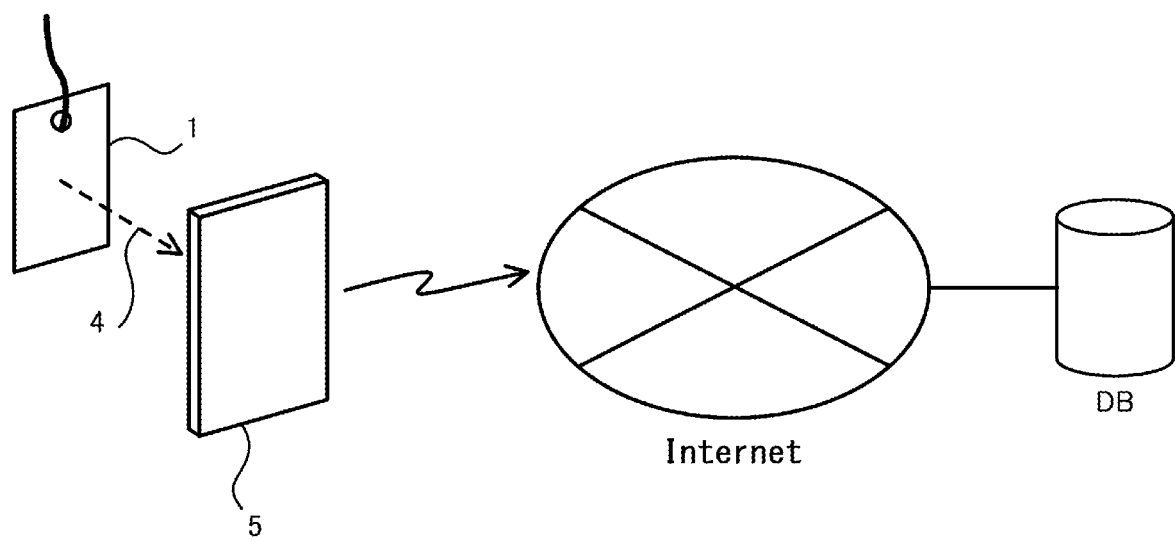
FIG. 4 is a diagram showing another example of the product assessment display method according to the present invention.

Furthermore, as shown in FIG. 4, according to another product assessment display method, the assessment result that has been gained by using the microplastic discharge amount assessment method may be recorded in a management server DB that is connected to the Internet in order to make it possible for a consumer to be able to easily peruse. In order to do this, it should be made possible for the tag 1, as in FIG. 3B, to show a barcode or a QR code (registered trademark) as indicated in the dotted-line frame 3, or for access information such as the URL that makes it possible to access the management server to be incorporated into an IC tag (chip) that is embedded in the tag 1.

A customer can utilize a portable terminal such as a smartphone that can connect to the Internet in order to read in the access information that is attached to the tag 1 (dotted-line arrow 4) and access the Internet in accordance with the access information, and thus can check the assessment result (average mass, assessment rank, and the like) of the textile product. It is also possible for the information to be stored in the management server to cover various pieces of information concerning the test pieces such as photographs of the test pieces, the type of textile product, the name of the material, the test date, and the examining institute.

INDUSTRIAL APPLICABILITY

As described above, the present invention makes it possible to provide a microplastic discharge amount assessment method according to which the discharge amount of microplastics that are discharged from a textile product that contains a synthetic resin can be objectively and quantitatively assessed, and at the same time to provide a product assessment display method that is useful when a customer selects the textile product.

REFERENCE SIGNS LIST

1 tag
2 assessment display
3 access information
5 terminal

The invention claimed is:

1. A microplastic discharge amount assessment method, by comprising:
 a washing step of taking out a test piece of a predetermined size or of a predetermined mass from a textile product that contains a synthetic resin so as to wash the test piece;
 a filtering step of allowing a filter to filter the wastewater that has been discharged in the washing step;
 a measurement step of measuring the mass of the textile waste that has been captured by the filter; and
 an assessment step of assessing the discharge amount of the microplastics that are discharged from the textile product on the basis of the results of measurement in the measurement step.

2. The microplastic discharge amount assessment method according to claim 1, characterized in that the filter is a membrane filter.

3. A product assessment display method, characterized in that the assessment result gained by using the microplastic discharge amount assessment method according to claim 1 is displayed on a tag that is attached to a textile product formed of the same material as that of the test piece.

4. A product assessment display method, characterized in that the assessment result gained by using the microplastic discharge amount assessment method according to claim 1 is recorded in a management server connected to the Internet so that the access information that is required for the connection to the management server is retained in a tag that is attached to a textile product formed of the same material as that of the test piece so as to be readable on a terminal that is connectable to the Internet.

* * * * *